(12) United States Patent
West et al.

(10) Patent No.: US 11,312,079 B2
(45) Date of Patent: Apr. 26, 2022

(54) BUILD MATERIAL RECYCLING DEVICE OF A THREE-DIMENSIONAL (3D) PRINTER

(71) Applicant: HEWLETT-PACKARD DEVELOPMENT COMPANY, L.P., Houston, TX (US)

(72) Inventors: Randall West, Vancouver, WA (US); Alexander David Laws, Vancouver, WA (US); Robert Lawrence Winburne, Vancouver, WA (US); Samantha Kang, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 823 days.

(21) Appl. No.: 16/075,484

(22) PCT Filed: Jul. 20, 2017

(86) PCT No.: PCT/US2017/043079
§ 371 (c)(1),
(2) Date: Aug. 3, 2018

(87) PCT Pub. No.: WO2019/017955
PCT Pub. Date: Jan. 24, 2019

(65) Prior Publication Data
US 2021/0206098 A1   Jul. 8, 2021

(51) Int. Cl.
*B29C 64/357* (2017.01)
*B33Y 10/00* (2015.01)
*B33Y 30/00* (2015.01)
*B29C 64/314* (2017.01)
*B29C 64/35* (2017.01)
*B33Y 40/10* (2020.01)
*B29C 64/153* (2017.01)

(52) U.S. Cl.
CPC .......... *B29C 64/357* (2017.08); *B29C 64/314* (2017.08); *B29C 64/35* (2017.08); *B33Y 10/00* (2014.12); *B33Y 30/00* (2014.12); *B33Y 40/10* (2020.01); *B29C 64/153* (2017.08)

(58) Field of Classification Search
CPC ..... B29C 64/153; B29C 64/357; B22F 10/70; B22F 10/73; B05B 14/44; B01D 45/08
See application file for complete search history.

(56) References Cited

U.S. PATENT DOCUMENTS

| | | | | |
|---|---|---|---|---|
| 4,378,728 A | * | 4/1983 | Berkmann | .............. B05B 14/48 454/53 |
| 6,932,935 B1 | * | 8/2005 | Oberhofer | .............. B33Y 10/00 264/497 |

(Continued)

FOREIGN PATENT DOCUMENTS

| CN | 101842222 A | 9/2010 |
|---|---|---|
| CN | 102164735 A | 8/2011 |

(Continued)

*Primary Examiner* — Joseph S Del Sole
*Assistant Examiner* — Ariella Machness
(74) *Attorney, Agent, or Firm* — Perry + Currier Inc

(57) ABSTRACT

In some examples, a build material recycling device of a three-dimensional (3D) printer can include an upper chamber including an inlet and a material separator coupled to the inlet, a classifier coupled to the upper chamber, and a lower chamber coupled to the classifier, where the classifier is located between the upper chamber and the lower chamber.

18 Claims, 3 Drawing Sheets

(56) References Cited

U.S. PATENT DOCUMENTS

| | | | |
|---|---|---|---|
| 7,074,274 B1* | 7/2006 | Shutic | B05B 14/45 |
| | | | 118/309 |
| 7,578,958 B2 | 8/2009 | Patel et al. | |
| 7,887,316 B2 | 2/2011 | Cox | |
| 9,364,897 B2 | 6/2016 | O'Neill | |
| 2011/0233808 A1 | 9/2011 | Davidson | |
| 2016/0200053 A1 | 7/2016 | Chen et al. | |
| 2016/0271887 A1* | 9/2016 | Shi | B29C 64/35 |
| 2017/0036404 A1 | 2/2017 | Rengers et al. | |
| 2018/0281284 A1* | 10/2018 | Elgar | B29C 64/364 |

FOREIGN PATENT DOCUMENTS

| | | |
|---|---|---|
| CN | 104723565 A | 6/2015 |
| CN | 105142826 A | 12/2015 |
| CN | 105818371 A | 8/2016 |
| EP | 3127636 A1 | 2/2017 |
| EP | 3112136 B1 | 1/2019 |
| WO | WO2017/055207 A1 | 4/2017 |
| WO | WO-2017084781 A1 | 6/2017 |

\* cited by examiner

BUILD MATERIAL RECYCLING DEVICE OF A THREE-DIMENSIONAL (3D) PRINTER

BACKGROUND

A three-dimensional (3D) printer may be used to create different 3D objects. 3D printers may utilize additive manufacturing techniques to create the 3D objects. For instance, a 3D printer may deposit material in successive layers in a build area of the 3D printer to create a 3D object. The material can be selectively fused, or otherwise solidified, to form the successive layers of the 3D object.

DETAILED DESCRIPTION

Some 3D printers can utilize a build material to create 3D objects. The build material can have a powdered and/or granular form. The 3D printer may apply build material in successive layers in a build area to create 3D objects. The build material can be selectively fused, and a next successive layer of build material may be applied to the build area.

As used herein, the term "3D printer" can, for example, refer to a device that can create a physical 3D object during a build process of the 3D printer. In some examples, the 3D printer can create the 3D object utilizing a 3D digital model. The 3D printer can create the 3D object by, for example, depositing a build material such as powder, and a fusing agent, in a build area of the 3D printer. As used herein, the term "build area" can, for example, refer to an area of the 3D printer in which a 3D object may be created. The build material may be deposited in successive layers on a build platform located in the build area to create the 3D object. In some examples, a 3D printer can create the 3D object utilizing powder bed fusion, among other types of 3D printing. For example, a 3D printer can utilize powder bed fusion by combining a fusing agent with the build material such that the fusing agent absorbs heat from a heat source in order to melt, fuse, and solidify the build material in order to create a 3D object.

Not all of the build material supplied to the build area of the 3D printer may be utilized during a build process of a 3D object using the 3D printer. For example, incidental build material may be spilled during the build process, and/or there may be non-solidified build material left over at the end of the build process.

The incidental and/or non-solidified build material may be reused during the build process and/or in a following build process. However, the incidental and/or non-solidified build material has to be recovered from the build area, and may have to be reconditioned for use in a build process.

A build material recycling device of a 3D printer according to the disclosure can receive incidental and/or non-solidified build material. The build material recycling device can recycle and recondition the incidental and/or non-solidified build material for a 3D printer build process.

Figure 1:
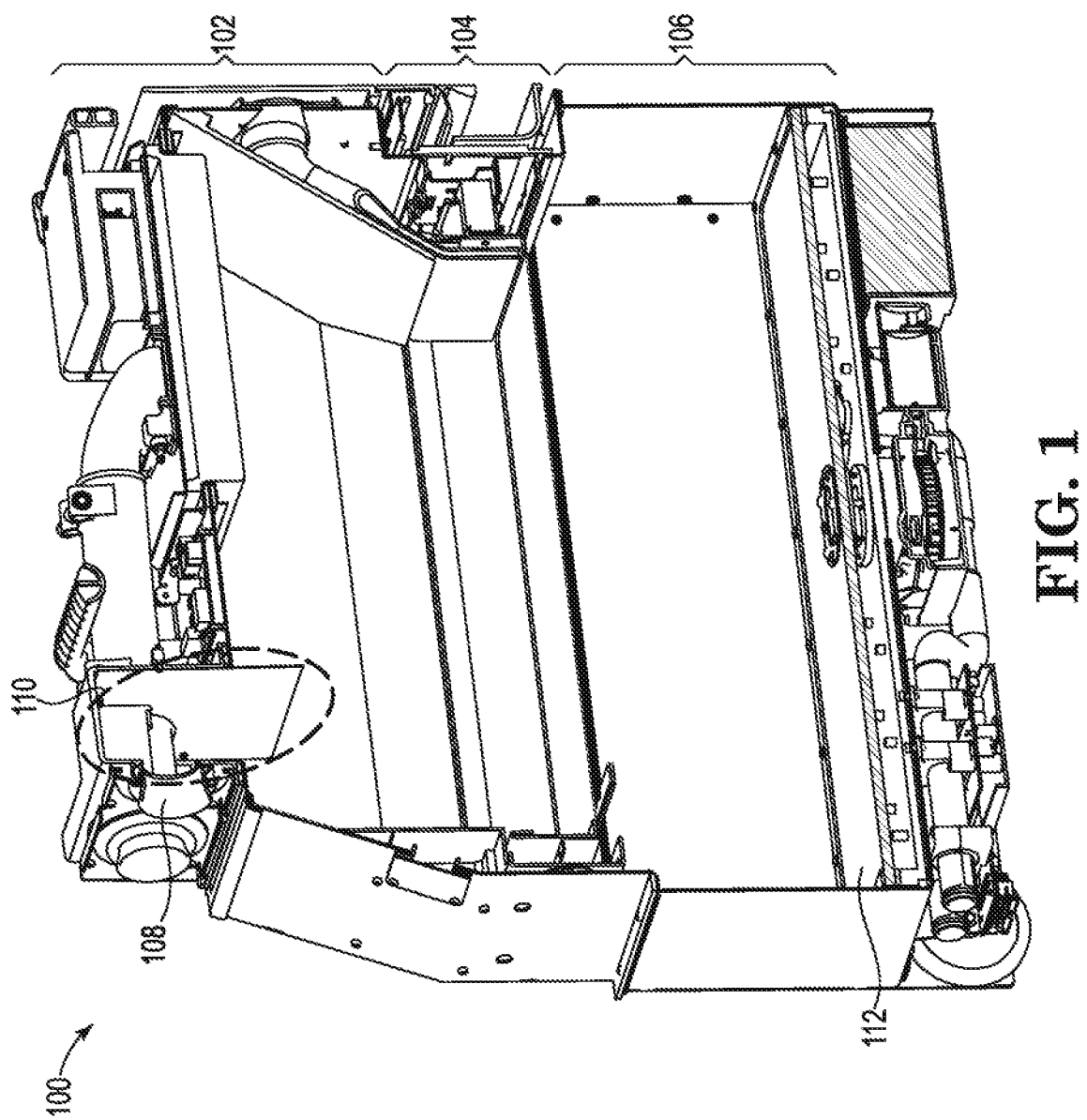
FIG. 1 illustrates a perspective view of an example of a build material recycling device of a 3D printer consistent with the disclosure.

FIG. 1 illustrates a perspective view of an example of a build material recycling device 100 of a 3D printer consistent with the disclosure. The build material recycling device 100 can include an upper chamber 102, a classifier 104, and a lower chamber 106.

Upper chamber 102 can include an inlet 108 and a material separator 110. As used herein, the term 'chamber' can, for example, refer to a housing, casing, and/or other enclosure. Inlet 108 can receive a gas and build material mixture via a pneumatic transport system included in the 3D printer. As used herein, the term "gas" can, for example, refer to a substance which expands to fill available space. Gas can be a gas mixture. As used herein, the term "material separator" can, for example, refer to an object to cause build material mixture to be separated from a gas and build material mixture.

As used herein, the term "build material" can refer to a material used to create 3D objects in the 3D printer. Build material can be, for example, a powdered semi-crystalline thermoplastic material, a powdered metal material, a powdered plastic material, a powdered composite material, a powdered ceramic material, a powdered glass material, a powdered resin material, a short fiber material, and/or a powdered polymer material, among other types of powdered or particulate material.

Material separator 110 can be coupled to inlet 108. For example, material separator 110 can be coupled to a second end of inlet 108, where the gas and build material mixture is received at a first end of inlet 108. The gas and build material mixture can travel in inlet 108 until the gas and build material mixture encounters material separator 110.

Build material can be separated from the gas and build material mixture by upper chamber 102, material separator 110, a filter, and/or a combination thereof. For example, build material can be separated from the gas and build material mixture by upper chamber 102, material separator 110, and a filter, as is further described herein.

In some examples, material separator 110 can be an impingement plate. As used herein, the term "impingement plate" can, for example, refer to an object to cause a flowrate of a gas and build material mixture to be slowed as a result of contact by the gas and build material mixture with the object.

The impingement plate can cause separation of build material from a gas and build material mixture when the gas and build material mixture is received by upper chamber 102 via inlet 108 and contacts the impingement plate. For example, the gas and build material mixture can enter inlet 108 at a first flowrate and contact the impingement plate, causing the flow rate of the gas and build material mixture to be reduced to a second flowrate. As a result of the reduced second flowrate, build material can fall away from the gas, as is further described in connection with FIG. 2.

In some examples, material separator 110 can be a cyclone separator to separate build material from the gas and build material mixture. As used herein, the term "cyclone separator" can, for example, refer to a device to remove particulates from gas through vortex separation. For example, upper chamber 102 of build material recycling device 100 can include a cyclone separator that may use vortex separation utilizing rotation and gravity to separate build material from the gas and build material mixture.

The build material included in the gas and build material mixture can be non-solidified or unfused build material. In some examples, build material may be incidentally spilled from a build platform of a build area and captured by a build material recycling system of the 3D printer. As used herein, the term "build platform" can, for example, refer to a build location of the 3D printer, such as a powder bed. For example, in a build process, the 3D printer may deposit build material in successive layers on the build platform to create a 3D object on the build platform. In some examples, build material deposited in the build area (e.g., on the build platform) but not utilized as a result of the 3D object being created by the 3D printer in the build area being completed can be captured by the build material recycling system of the 3D printer. The build material recycling system may be a pneumatic transport system to capture non-solidified build material from the build area of the 3D printer, and transport the non-solidified build material to build material recycling device 100.

Build material can be separated from the gas and build material mixture by upper chamber 102. For example, the gas and build material mixture can enter upper chamber 102 at a second flow rate. The volume of upper chamber 102 can cause the gas and build material to slow to a third flow rate. In other words, the volume of upper chamber 102 can cause the flow rate of the gas and build material mixture to slow such that build material can be separated from the gas and build material mixture. In this manner, upper chamber 102 can serve as a settling chamber. In some examples, upper chamber 102 can allow build material that may not have separated from the gas and build material mixture as a result of contact with material separator 110 to separate from the gas and build material mixture.

Although not shown in FIG. 1 for clarity and so as not to obscure examples of the disclosure, build material recycling device 100 can include a filter. The filter can separate any remaining build material that may not have been separated by material separator 110 and/or upper chamber 102, as is further described in connection with FIG. 2.

Build material recycling device 100 can include classifier 104. As used herein, the term "classifier" can, for example, refer to a device for separating solids of different characteristics. For example, classifier 104 can separate contaminants and/or other particles from the build material separated from the gas and build material mixture. Classifier 104 can be coupled to upper chamber 102. Classifier 104 can be located beneath upper chamber 102.

Classifier 104 can include a mesh screen to classify build material separated from the gas and build material mixture by material separator 110. As used herein, the term "mesh screen" can, for example, refer to an arrangement of links or wires with spaced apart openings between, as is further described in connection with FIG. 2. The mesh screen can be a metal mesh screen, among other types and/or materials of mesh screens.

Classifier 104 can classify build material separated from the gas and build material mixture by sifting the separated build material with the mesh screen. As used herein, the term "sift" can, for example, refer to separating particles such that particles of one size pass through a barrier and particles of a different size are retained by the barrier. For example, the openings of the mesh screen can separate build material from other contaminants by allowing build material to pass through the mesh screen and preventing contaminants from passing through the mesh screen.

Classifier 104 can be removable from build material recycling device 100. For example, classifier 104 may be removed from build material recycling device 100 in order to remove contaminants remaining on the mesh screen that have been separated from build material by sifting. In some examples, classifier 104 can be removed from build material recycling device 100 for cleaning and/or replacement.

Build material recycling device 100 can include lower chamber 106. Lower chamber 106 can be coupled to classifier 104. Classifier 104 can be located between upper chamber 102 and lower chamber 106. Lower chamber 106 can include fluidizing membrane 112. As used herein, the term "fluidizing membrane" can, for example, refer to a thin sheet of material located at the bottom of lower chamber 106. Fluidizing membrane 112 can be porous such that air can pass through the fluidizing membrane 112, but not build material.

Fluidizing membrane 112 can be a plastic, metal, and/or cloth material. For example, fluidizing membrane 112 can be a polyethylene material, cloth, plastic, metal, sintered plastic, sintered metal, and/or sintered cloth material, among other types of materials.

Build material recycling device 100 can receive and receive a gas and build material mixture and separate the build material from the gas. Build material recycling device 100 can allow for build material recycling with a compact device, allowing for a smaller recycling device and higher space efficiency in the 3D printer.

Figure 2:
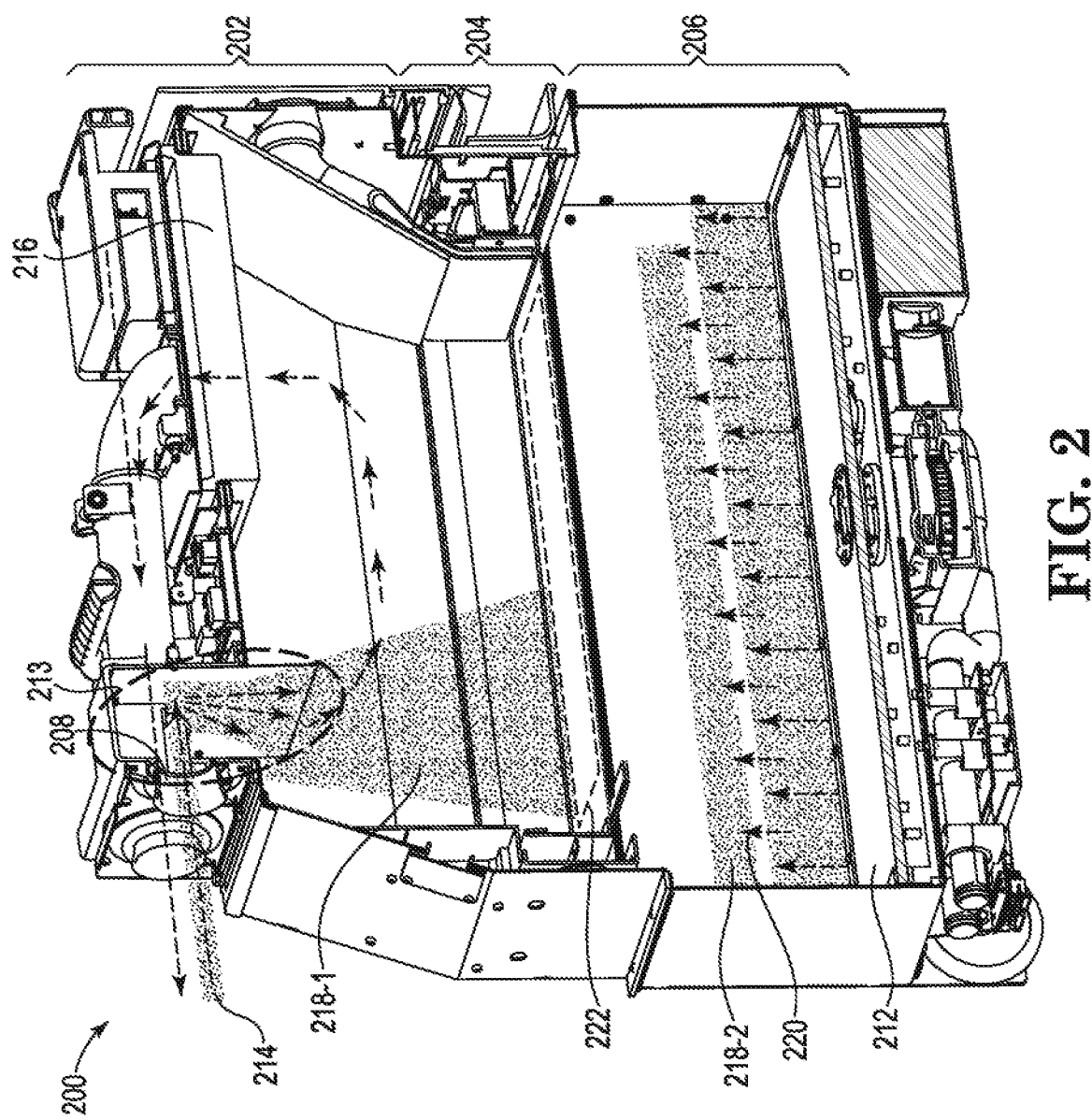
FIG. 2 illustrates a perspective view of an example of a build material recycling device of a 3D printer consistent with the disclosure.

FIG. 2 illustrates a perspective view of an example of a build material recycling device 200 of a 3D printer consistent with the disclosure. The build material recycling device 200 can include an upper chamber 202, a classifier 204, and a lower chamber 206. Upper chamber 202 can include an inlet 208, impingement plate 213, and filter 216. Classifier 204 can include a mesh screen 222. Lower chamber 206 can include fluidizing membrane 212.

As illustrated in FIG. 2, inlet 208 can receive a gas and build material mixture 214. Gas and build material mixture 214 can be delivered to inlet 208 via a pneumatic transport system included in the 3D printing device, as previously described in connection with FIG. 1. For example, the build material of gas and build material mixture 214 can be build material incidentally spilled from the build platform of the build area, and/or non-solidified build material not used when a build process is completed.

Build material can be separated from the gas and build material mixture by upper chamber 202, impingement plate 213, filter 216, and/or a combination thereof. For example, build material can be separated from the gas and build material mixture by upper chamber 202, impingement plate 213, and filter 216, as is further described herein.

As shown in FIG. 2, build material recycling device 200 can include impingement plate 213. Impingement plate 213 can cause separation of build material from gas and build material mixture 214 when gas and build material mixture 214 contact impingement plate 213. For example, gas and build material mixture 214 can enter inlet 208 and be slowed by impingement plate 213 as gas and build material mixture 214 contact impingement plate 213.

Impingement plate 213 can slow the flow rate of gas and build material mixture 214 below a threshold flow rate to separate build material from gas and build material mixture 214. As used herein, the term "flow rate" can, for example, refer to a volume of matter which passes per unit of time. For example, gas and build material mixture 214 can enter inlet 208 at a first flow rate, and impingement plate 213 can slow gas and build material mixture 214 to a second flow rate.

The gas velocity at the second flow rate of gas and build material mixture 214 can be lowered by impingement plate 213 such that build material can fall away from the gas as a result of gravity. In other words, gravitational forces on the build material of gas and build material mixture 214 at the second flow rate can be higher than kinetic forces of the gas and build material mixture 214, allowing build material 218-1 to be separated from the gas and fall into classifier 204.

The gas velocity at the second flow rate can be around 0.35 meters per second (m/s). For example, the gas velocity at which build material can be separated from gas and build material mixture 214 can be 0.35 m/s. However, examples of the disclosure are not so limited. For instance, the gas velocity at which build material can be separated from gas and build material mixture 214 can be higher than 0.35 m/s or lower than 0.35 m/s. The gas velocity at which build material can be separated from gas and build material mixture 214 can depend on a type of build material, as previously described in connection with FIG. 1.

Although upper chamber 202 is described as including an impingement plate 213, examples of the disclosure are not so limited. For example, although not shown in FIG. 2 for clarity and so as not to obscure examples of the disclosure, upper chamber 202 can include a cyclone separator. The cyclone separator can receive gas and build material mixture 214 and can separate build material 218-1 from gas and build material mixture 214.

Build material can be separated from gas and build material mixture 214 by upper chamber 202. For example, gas and build material mixture 214 can flow past impingement plate 213, where the volume of upper chamber 202 can cause further build material that may not have separated from gas and build material mixture 214 as a result of contact with impingement plate 213 to separate from gas and build material mixture 214 by slowing the flow rate of gas and build material mixture 214.

Upper chamber 202 can include filter 216. As used herein, the term "filter" can, for example, refer to a device including a physical barrier to block certain objects or substances while letting others pass through the physical barrier. Filter 216 can remove build material not removed from gas and build material mixture 214 by impingement plate 213, by the cyclone separator, and/or by the volume of upper chamber 202. For example, gas and build material mixture 214 may contact impingement plate 213 or enter the cyclone separator causing the build material to separate from gas and build material mixture 214. Gas and build material mixture 214 may enter the volume of upper chamber 202, resulting in a reduced flow rate, causing further build material to separate from gas and build material mixture 214. However, not all of the build material may separate from gas and build material mixture 214. In other words, some build material may still be included in the gas after gas and build material mixture 214 contacts impingement plate 213 or enters the cyclone separator, or enters the volume of upper chamber 202.

Filter 216 can remove any build material left in the gas after gas and build material mixture 214 contacts impingement plate 213 or enters the cyclone separator, or enters the volume of upper chamber 202. For example, the physical barrier of filter 216 can block build material while letting the gas pass through filter 216.

Although not shown in FIG. 2 for clarity and so as not to obscure examples of the disclosure, upper chamber 202 can include an outlet. The outlet can discharge the gas after build material is separated from the gas. For example, the outlet can discharge the gas after build material is separated from the gas via impingement plate 213 and filter 216. In some examples, the outlet can be located adjacent to inlet 208.

Upper chamber 202 can include a filter cleaning device. The filter cleaning device can clean filter 216 of build material. For example, build material may accumulate on the physical barrier of filter 216 after filtering build material for an amount of time. The filter cleaning device can clean filter 216 of the accumulated build material.

In some examples, the filter cleaning device can clean filter 216 of build material when gas flow into inlet 208 is reduced or shut off. For example, once gas flow into inlet 208 is reduced or shut off, filter cleaning device can clean filter 216, allowing accumulated build material to fall into classifier 204.

The filter cleaning device can vibrate filter 216 to clean filter 216 of build material. For example, the vibrations on filter 216 by the filter cleaning device can cause build material accumulated on filter 216 to fall into classifier 204.

Classifier 204 can include mesh screen 222 to classify separated build material 218-1 to remove contaminants from build material 218-1. For example, mesh screen 222 can allow separated build material 218-1 to pass through mesh screen 222 while preventing contaminants from passing through.

Mesh screen 222 can include a predetermined mesh size. The predetermined mesh size can be based on the type of build material. For example, the mesh size of mesh screen 222 can be 350 microns, although examples of the disclosure are not limited to 350 microns. For example, the mesh size of mesh screen 222 can be larger than 350 microns or smaller than 350 microns.

Although classifier 204 is shown in FIG. 2 as including one mesh screen 222, examples of the disclosure are not so limited. For example, classifier 204 can include a multi-staged mesh screen. In other words, classifier 204 can include multiple mesh screens which may be oriented vertically relative to each other. In some examples, the multiple stages of mesh screens can be different mesh sizes. For example, a first mesh screen can be 350 microns and a second mesh screen can be 300 microns, among other examples.

Classifier 204 can classify separated build material 218-1 by sifting separated build material 218-1 with mesh screen 222. Mesh screen 222 can vibrate to sift separated build material 218-1. For example, the vibrating mesh screen 222 can cause separated build material 218-1 to pass through mesh screen 222 to lower chamber 206, while preventing contaminants from passing through mesh screen 222 and keeping the contaminants in classifier 204.

Lower chamber 206 can include fluidizing membrane 212. Fluidizing membrane 212 can recondition classified build material 218-2. Build material transported from the build area of the 3D printer by the pneumatic transport system may, as a result of exposure to different conditions and environments before and/or during transport, not have properties ideal for use or reuse in a build process of the 3D printer. In other words, the build material may have to be reconditioned in order to be used in the build process of a 3D object. For example, the build material may have to be heated, cooled, ionized, deionized, humidified, and/or de-humidified, among other examples of reconditioning techniques.

Lower chamber 206 can recondition classified build material 218-2 by percolating conditioned gas 220 through fluidizing membrane 212 into classified build material 218-2. As used herein, the term "conditioned gas" can, for example, refer to a gas that has been heated, cooled, ionized, de-ionized, humidified, and/or de-humidified, among other examples of conditioned gas. As used herein, the term "percolating" can, for example, refer to causing a gas to pass, filter, and/or permeate through a porous body. For example, conditioned gas 220 can percolate through fluidizing membrane 212 into classified build material 218-2 in order to recondition classified build material 218-2 for use or reuse in the 3D printer.

Reconditioning classified build material 218-2 can include percolating conditioned gas 220 through classified build material 218-2 via fluidizing membrane 212. As described in connection with FIG. 1, fluidizing membrane 212 can be a porous material to allow conditioned gas 220 through fluidizing membrane 212. The conditioned gas 220 can pass through fluidizing membrane 212 and into classified build material 218-2, but classified build material 218-2 can be prevented from passing through fluidizing membrane 212.

In some examples, conditioned gas 220 can percolate through fluidizing membrane 212 into classified build material 218-2 for a predetermined amount of time. For example, conditioned gas 220 can percolate through fluidizing membrane 212 into classified build material 218-2 for one hour, less than one hour, or more than one hour. The predetermined amount of time can be based on the type of build material being utilized for a build process in the 3D printer.

Percolating conditioned gas 220 can include percolating temperature controlled gas through classified build material 218-2, humidified gas through classified build material 218-2, de-humidified gas through classified build material 218-2, ionized gas through classified build material 218-2, and/or de-ionized gas through classified build material 218-2, among other types of conditioned gas 220.

A build material recycling device of a 3D printer according to the disclosure can allow for recycling and reconditioning of build material for a 3D printer. The recycled and reconditioned build material can be reused in an ongoing build process of the 3D printer and/or used in a future build process. While flow rates and/or gas and build material mixture ratios may fluctuate, the build material recycling device can efficiently recycle and recondition build material. The enclosed build material recycling device according to the disclosure can provide higher recycling efficiency relative to other build material recycling devices.

Figure 3:
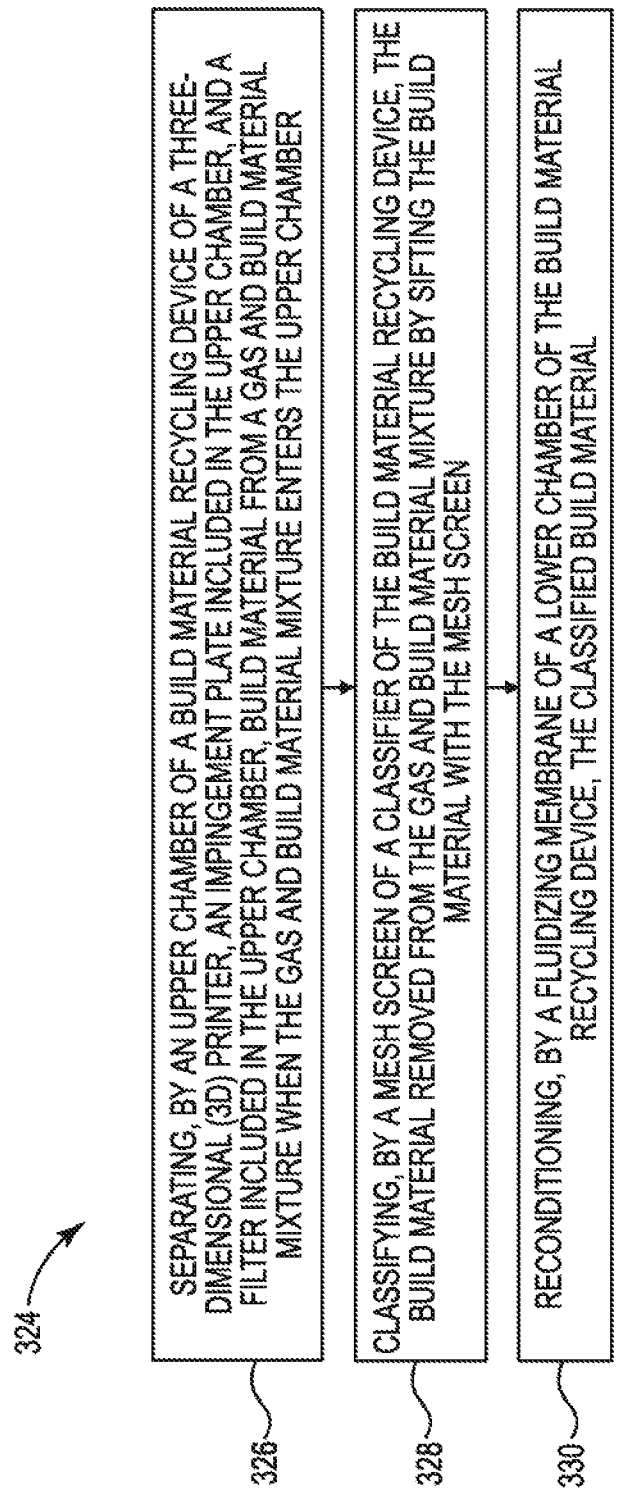
FIG. 3 illustrates an example of a method to separate and recondition build material with a build material recycling device of a 3D printer consistent with the disclosure.

FIG. 3 illustrates an example of a method 324 to separate and recondition build material with a build material recycling device of a 3D printer consistent with the disclosure. For example, method 324 may be performed by a build material recycling device (e.g., build material recycling device 100, 200, described in connection with FIGS. 1 and 2, respectively).

At 326, the method 324 includes separating, by an upper chamber of a build material recycling device of a 3D printer, an impingement plate included in the upper chamber, and a filter included in the upper chamber, build material from a gas and build material mixture when the gas and build material mixture enters the upper chamber. For example, the gas and build material mixture can contact the impingement plate, resulting in a slowing of a flow rate of the gas and build material mixture such that build material can separate from the gas and build material mixture. The gas and build material mixture can enter a volume of the upper chamber, resulting in a slowing of the flow rate such that further build material can separate from the gas and build material mixture. The upper chamber can include a filter to further separate any build material that may not have been separated from the gas and build material mixture by the impingement plate and/or the volume of the upper chamber. The build material can be collected by a classifier of the build material recycling device.

At 328, the method 324 includes classifying, by a mesh screen of a classifier of the build material recycling device, the build material removed from the gas and build material mixture by sifting the build material with the mesh screen. For example, the mesh screen can sift the build material such that the build material can pass through the mesh screen, while contaminants can be prevented from passing through the mesh screen. The classifier can be a multi-stage classifier such that the build material can pass through multiple mesh screens.

At 330, the method 324 can include reconditioning, by a fluidizing membrane of a lower chamber of the build material recycling device, the classified build material. Reconditioning the classified build material can include percolating conditioned gas through the classified build material via the fluidizing membrane. For example, the fluidizing membrane can be a porous membrane such that the conditioned gas can be percolated through the fluidizing membrane into the classified build material.

Reconditioning the classified build material can include heating, cooling, ionizing, deionizing, humidifying, and/or de-humidifying the classified build material, among other reconditioning techniques. The classified build material can be reconditioned via the fluidizing membrane such that the classified build material can be reused in a build process of the 3D printer or used in a future build process.

As used herein, "logic" is an alternative or additional processing resource to perform a particular action and/or element described herein. Logic may include hardware. The hardware may include processing resources such as circuitry, which are distinct from machine readable instructions on a machine readable media. Further, as used herein, "a" thing may refer to one, or more than one of such things. For example, "a widget" may refer to one widget, or more than one widget.

The figures follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

Multiple analogous elements within one figure may be referenced with a reference numeral followed by a hyphen and another numeral or a letter. For example, 218-1 may reference element 18-1 in FIGS. 2 and 218-2 may reference element 18-2, which can be analogous to element 18-1. Such analogous elements may be generally referenced without the hyphen and extra numeral or letter. For example, elements 218-1 and 218-2 may be generally referenced as 218.

The above specification, examples and data provide a description of the method and applications, and use of the system and method of the present disclosure. Since many examples may be made without departing from the spirit and scope of the system and method of the present disclosure, this specification merely sets forth some of the many possible example configurations and implementations.

What is claimed is:

1. A build material recycling device of a three-dimensional (3D) printer, comprising:
    an upper chamber including:
        an inlet; and
        a material separator coupled to the inlet;
    a classifier coupled to the upper chamber to classify build material; and
    a lower chamber coupled to the classifier, wherein the lower chamber includes a fluidizing membrane to recondition classified build material;

wherein the classifier is located between the upper chamber and the lower chamber;

wherein the material separator includes an impingement plate positioned with respect to the inlet to receive direct impingement of a gas and build material mixture flowing into the upper chamber via the inlet, wherein the impingement plate is to cause separation of build material from the gas and build material mixture when the gas and build material mixture is received by the upper chamber via the inlet.

2. The build material recycling device of claim 1, wherein the lower chamber reconditions build material classified by the classifier by percolating conditioned gas through the fluidizing membrane into the classified build material.

3. The build material recycling device of claim 1, wherein the classifier includes a mesh screen to classify build material separated from the gas and build material mixture by the impingement plate by sifting the separated build material with the mesh screen.

4. The build material recycling device of claim 1, wherein the classifier is removable from the build material recycling device.

5. The build material recycling device of claim 1, wherein the upper chamber includes a filter to remove build material not removed from a gas and build material mixture by the material separator.

6. A build material recycling device of a three-dimensional (3D) printer, comprising:
an upper chamber, including:
an impingement plate positioned with respect to an inlet of the upper chamber to receive direct impingement of a gas and build material mixture flowing into the upper chamber via the inlet to cause separation of build material from the gas and build material mixture when the gas and build material mixture contacts the impingement plate; and
a filter to remove build material not removed from the gas and build material mixture by the impingement plate;
wherein a volume of the upper chamber slows the gas and build material mixture to cause the separation of build material from the gas and build material mixture;
a classifier including a mesh screen to classify the build material to remove contaminants from the build material by sifting the build material with the mesh screen; and
a lower chamber including a fluidizing membrane to recondition the classified build material.

7. The build material recycling device of claim 6, wherein the mesh screen vibrates to sift the build material.

8. The build material recycling device of claim 6, wherein the upper chamber includes a filter cleaning device to clean the filter of build material.

9. The build material recycling device of claim 8, wherein the filter cleaning device vibrates the filter to clean the filter of build material.

10. The build material recycling device of claim 6, wherein the build material in the gas and build material mixture is non-solidified build material.

11. A method, comprising:
separating, by an upper chamber of a build material recycling device of a three-dimensional (3D) printer, an impingement plate included in the upper chamber, and a filter included in the upper chamber, build material from a gas and build material mixture when the gas and build material mixture enters the upper chamber via an inlet, wherein the separating includes direct impingement against the impingement plate of the gas and build material mixture flowing into the upper chamber from the inlet;
classifying, by a mesh screen of a classifier of the build material recycling device, the build material removed from the gas and build material mixture by sifting the build material with the mesh screen; and
reconditioning, by a fluidizing membrane of a lower chamber of the build material recycling device, the classified build material.

12. The method of claim 11, wherein the method includes slowing a flow rate of the gas and build material mixture below a threshold flow rate by the upper chamber and the impingement plate to separate the build material from the gas and build material mixture.

13. The method of claim 11, wherein the method includes reconditioning the classified build material by percolating conditioned gas through the classified build material via the fluidizing membrane.

14. The method of claim 13, wherein percolating the conditioned gas can include at least one of percolating:
temperature controlled gas through the classified build material;
humidified gas through the classified build material; and
ionized gas through the classified build material.

15. The build material recycling device of claim 3, wherein the mesh screen vibrates to sift the build material.

16. The build material recycling device of claim 5, wherein the upper chamber includes a vibrating filter cleaning device to clean the filter of build material.

17. The build material recycling device of claim 1, wherein the upper chamber and the material separator are configured to slow a flow rate of a gas and build material mixture to below a threshold flow rate.

18. The build material recycling device of claim 2, wherein the lower chamber is configured to percolate conditioned gas through the fluidizing membrane into the classified build material with at least one of:
temperature controlled gas through the classified build material;
humidified gas through the classified build material; and
ionized gas through the classified build material.

* * * * *